US012681597B1

(12) United States Patent
Chuang et al.

(10) Patent No.: US 12,681,597 B1
(45) Date of Patent: Jul. 14, 2026

(54) HUMAN INTERFACE DEVICE

(71) Applicant: PIXART IMAGING INC., Hsin-Chu
(TW)

(72) Inventors: Xiao-Lin Chuang, Hsin-Chu (TW);
Che-Chia Hsu, Hsin-Chu (TW);
Yu-Han Chen, Hsin-Chu (TW)

(73) Assignee: PIXART IMAGING INC., Hsin-Chu
(TW)

( * ) Notice: Subject to any disclaimer, the term of this
patent is extended or adjusted under 35
U.S.C. 154(b) by 0 days.

(21) Appl. No.: 19/023,869

(22) Filed: Jan. 16, 2025

(51) Int. Cl.
G06F 3/02 (2006.01)
G06F 3/041 (2006.01)

(52) U.S. Cl.
CPC .............. G06F 3/0416 (2013.01); G06F 3/02
(2013.01)

(58) Field of Classification Search
CPC ................................. G06F 3/0416; G06F 3/02
See application file for complete search history.

(56) References Cited

U.S. PATENT DOCUMENTS

| | | | | | |
|---|---|---|---|---|---|
| 4,751,379 | A | * | 6/1988 | Sasaki | G06F 3/0421 |
| | | | | | 250/221 |
| 8,289,292 | B2 | * | 10/2012 | Sip | G06F 3/0416 |
| | | | | | 345/173 |
| 2003/0071797 | A1 | * | 4/2003 | Chang | G06F 3/045 |
| | | | | | 345/173 |

| | | | | | |
|---|---|---|---|---|---|
| 2010/0177121 | A1 | * | 7/2010 | Homma | G06F 3/0416 |
| | | | | | 345/659 |
| 2011/0310038 | A1 | * | 12/2011 | Park | G06F 3/044 |
| | | | | | 345/173 |
| 2015/0149954 | A1 | * | 5/2015 | Lin | G06F 3/04817 |
| | | | | | 715/781 |
| 2015/0309646 | A1 | * | 10/2015 | Nishida | G06F 3/0412 |
| | | | | | 345/174 |
| 2018/0307365 | A1 | * | 10/2018 | Chen | G06F 1/3262 |
| 2019/0155444 | A1 | * | 5/2019 | Park | G06F 3/0446 |
| 2020/0150778 | A1 | * | 5/2020 | Ko | G06F 3/0202 |
| 2020/0285349 | A1 | * | 9/2020 | Lin | G06F 3/0412 |
| 2024/0248560 | A1 | * | 7/2024 | Ou | G06F 3/04162 |

\* cited by examiner

*Primary Examiner* — Jeff Piziali

(74) *Attorney, Agent, or Firm* — Li & Cai Intellectual
Property (USA) Office

(57) ABSTRACT

A human interface device includes a touch panel and a
processing module that is electrically coupled to the touch
panel. The touch panel has a first setting region and defines
a second setting region in the first setting region. The
processing module has a coordinate detection mechanism
and a coordinate conversion mechanism. The coordinate
detection mechanism defines a first longitudinal coordinate
axis having a distance mapping to a length of the first setting
region. The coordinate conversion mechanism defines a
second longitudinal coordinate axis having a distance map-
ping to a length of the second setting region. When the
second setting region is operated, a touch point of the second
setting region has a coordinate of the first longitudinal
coordinate axis that is obtained through the coordinate
detection mechanism and that is converted to a second
longitudinal coordinate of the second longitudinal coordi-
nate axis through the coordinate conversion mechanism.

11 Claims, 12 Drawing Sheets

HUMAN INTERFACE DEVICE

FIELD OF THE DISCLOSURE

The present disclosure relates to a human interface device (HID), and more particularly to an HID having a touch panel.

BACKGROUND OF THE DISCLOSURE

As touch requirements, e.g., for electronic devices, become more and more diversified, a touch panel needs to be able to support changes in different touch regions without affecting the resolution (e.g., dots per inch (DPI)). However, the touch panel of a conventional human interface device (HID) has not yet been able to meet such requirements.

SUMMARY OF THE DISCLOSURE

In response to the above-referenced technical inadequacies, the present disclosure provides a human interface device (HID) for effectively improving on the issues associated with conventional human interface devices.

In order to solve the above-mentioned problems, one of the technical aspects adopted by the present disclosure is to provide a human interface device (HID), which includes a touch panel and a processing module. The touch panel has a first setting region that has a first length $(D_1)$. The touch panel defines a second setting region in the first setting region, and the second setting region has a second length $(D_2)$ that is less than the first length. The processing module is electrically coupled to the touch panel and includes a coordinate detection mechanism and a coordinate conversion mechanism. The coordinate detection mechanism defines a first longitudinal coordinate axis that has a first minimum coordinate $(X_{1\text{-}min})$, a first central coordinate $(X_{1\text{-}central})$, and a first maximum coordinate $(X_{1\text{-}max})$. The first minimum coordinate and the first maximum coordinate have a distance therebetween mapping to the first length of the first setting region, the first central coordinate is an average value of the first minimum coordinate and the first maximum coordinate. The coordinate conversion mechanism defines a second longitudinal coordinate axis that has a second minimum coordinate $(X_{2\text{-}min})$, a second central coordinate $(X_{2\text{-}central})$, and a second maximum coordinate $(X_{2\text{-}max})$. The second minimum coordinate and the second maximum coordinate have a distance therebetween mapping to the second length of the second setting region, the second central coordinate is defined to be same as the first central coordinate. The second minimum coordinate $(X_{2\text{-}min})$ and the second maximum coordinate $(X_{2\text{-}max})$ respectively satisfy two equations of: $X_{2\text{-}min}=(X_{1\text{-}max}-D_2)/2$; and $X_{2\text{-}max}=(X_{1\text{-}max}+D_2)/2$. The processing module is configured to control the touch panel to selectively operate the first setting region in a first touch mode or the second setting region in a second touch mode. The coordinate detection mechanism is configured to detect a touch coordinate of the touch panel corresponding to the first longitudinal coordinate axis. When the touch panel is in the second touch mode, a touch point of the touch panel is detected and defined as a first longitudinal coordinate $(X_1)$ of the first longitudinal coordinate axis by the coordinate detection mechanism, and the coordinate conversion mechanism converts the first longitudinal coordinate to a second longitudinal coordinate $(X_2)$ of the second longitudinal coordinate axis.

In one of the possible or preferred embodiments, a top edge and a bottom edge of the second setting region are respectively overlapped with a top edge and a bottom edge of the first setting region, and a width of the second setting region is identical to a width of the first setting region.

In one of the possible or preferred embodiments, the first setting region defines a first left button and a first right button respectively mapping to two opposite sides of the first central coordinate, and the second setting region defines a second left button and a second right button respectively mapping to two opposite sides of the second central coordinate.

In one of the possible or preferred embodiments, a bottom of the first left button and a bottom of the first right button are overlapped with a bottom edge of the first setting region, and a bottom of the second left button and a bottom of the second right button are overlapped with a bottom edge of the second setting region.

In one of the possible or preferred embodiments, an area of the second setting region is within a range from 30% to 90% of an area of the first setting region.

In one of the possible or preferred embodiments, a left edge of the second setting region is overlapped with a left edge of the first setting region, and the second longitudinal coordinate is a sum of the first longitudinal coordinate and the second minimum coordinate $(X_2=X_1+X_{2\text{-}min})$.

In one of the possible or preferred embodiments, the touch panel defines at least one additional region that is located in the first setting region and that is arranged outside of the second setting region. When the touch panel is in the second touch mode, the at least one additional region has an additional touch function that is different from a touch function of the second setting region.

In one of the possible or preferred embodiments, the touch panel defines at least one additional region that is located in the first setting region and that is arranged outside of the second setting region. When the touch panel is in the second touch mode, the at least one additional region has no touch function.

In one of the possible or preferred embodiments, the HID further includes a housing that has an opening. The touch panel and the processing module are assembled in the housing, the first setting region of the touch panel is exposed from the opening, and an area of the first setting region is substantially equal to an area of the opening.

In one of the possible or preferred embodiments, the HID further includes a display that is electrically coupled to the processing module. When the touch panel is in the second touch mode, the second setting region is operable to control a movement of a cursor of the display.

In one of the possible or preferred embodiments, the touch panel has a first dots per inch (DPI) in the first control mode and a second DPI in the second touch mode, and the first DPI is equal to the second DPI.

In order to solve the above-mentioned problems, another one of the technical aspects adopted by the present disclosure is to provide a human interface device (HID), which includes a touch panel and a processing module. The touch panel has a first setting region that has a first length $(D_1)$. The touch panel defines a second setting region covering the first setting region, and the second setting region has a second length $(D_2)$ that is greater than the first length. The processing module is electrically coupled to the touch panel and includes a coordinate detection mechanism and a coordinate conversion mechanism. The coordinate detection mechanism defines a first longitudinal coordinate axis that has a first minimum coordinate $(X_{1\text{-}min})$, a first central coordinate $(X_{1\text{-}central})$, and a first maximum coordinate $(X_{1\text{-}max})$. The first minimum coordinate and the first maximum coordinate have a distance therebetween mapping to the first length of the first setting region, and the first central coordinate is an average value of the first minimum coordinate and the first maximum coordinate. The coordinate conversion mechanism defines a second longitudinal coordinate axis that has a second minimum coordinate $(X_2\text{-min})$, a second central coordinate $(X_{2\text{-central}})$, and a second maximum coordinate $(X_{2\text{-max}})$. The second minimum coordinate and the second maximum coordinate have a distance therebetween mapping to the second length of the second setting region, and the second longitudinal coordinate axis has a second start coordinate $(X_{2\text{-start}})$ mapping to the first minimum coordinate and a second end coordinate $(X_{2\text{-end}})$ mapping to the first maximum coordinate. The second start coordinate $(X_{2\text{-start}})$ and the second end coordinate $(X_{2\text{-end}})$ respectively satisfy two equations of: $X_{2\text{-start}}=(X_{2\text{-max}}-D_1)/2$; and $X_{2\text{-end}}=(X_{2\text{-max}}+D_1)/2$. When the second setting region of the touch panel is operated, a touch point of the second setting region is detected and defined as a first longitudinal coordinate $(X_1)$ of the first longitudinal coordinate axis by the coordinate detection mechanism, and the coordinate conversion mechanism converts the first longitudinal coordinate to a second longitudinal coordinate $(X_2)$ of the second longitudinal coordinate axis.

In one of the possible or preferred embodiments, a top edge and a bottom edge of the first setting region are respectively overlapped with a top edge and a bottom edge of the second setting region, and a width of the second setting region is identical to a width of the first setting region.

In one of the possible or preferred embodiments, the first setting region defines a first left button and a first right button respectively mapping to two opposite sides of the first central coordinate.

In one of the possible or preferred embodiments, a bottom of the first left button and a bottom of the first right button are overlapped with a bottom edge of the first setting region.

In one of the possible or preferred embodiments, an area of the first setting region is within a range from 30% to 90% of an area of the second setting region.

In one of the possible or preferred embodiments, a left edge of the second setting region is overlapped with a left edge of the first setting region, and the second longitudinal coordinate is a sum of the first longitudinal coordinate and the second start coordinate $(X_2=X_1+X_{2\text{-start}})$.

In one of the possible or preferred embodiments, a housing that has an opening, wherein the touch panel and the processing module are assembled in the housing, the first setting region of the touch panel is exposed from the opening, and an area of the first setting region is substantially equal to an area of the opening.

Therefore, the HID of the present disclosure can be configured to transmit coordinates of the first setting region and the second setting region of the touch panel, and can provide a determination of left button and right button of the touch panel through the coordinate detection mechanism and the coordinate conversion mechanism, thereby remedying the issues of a conventional operating system (OS) only performing analysis on the first setting region, and effectively expanding the functionality of the touch panel.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
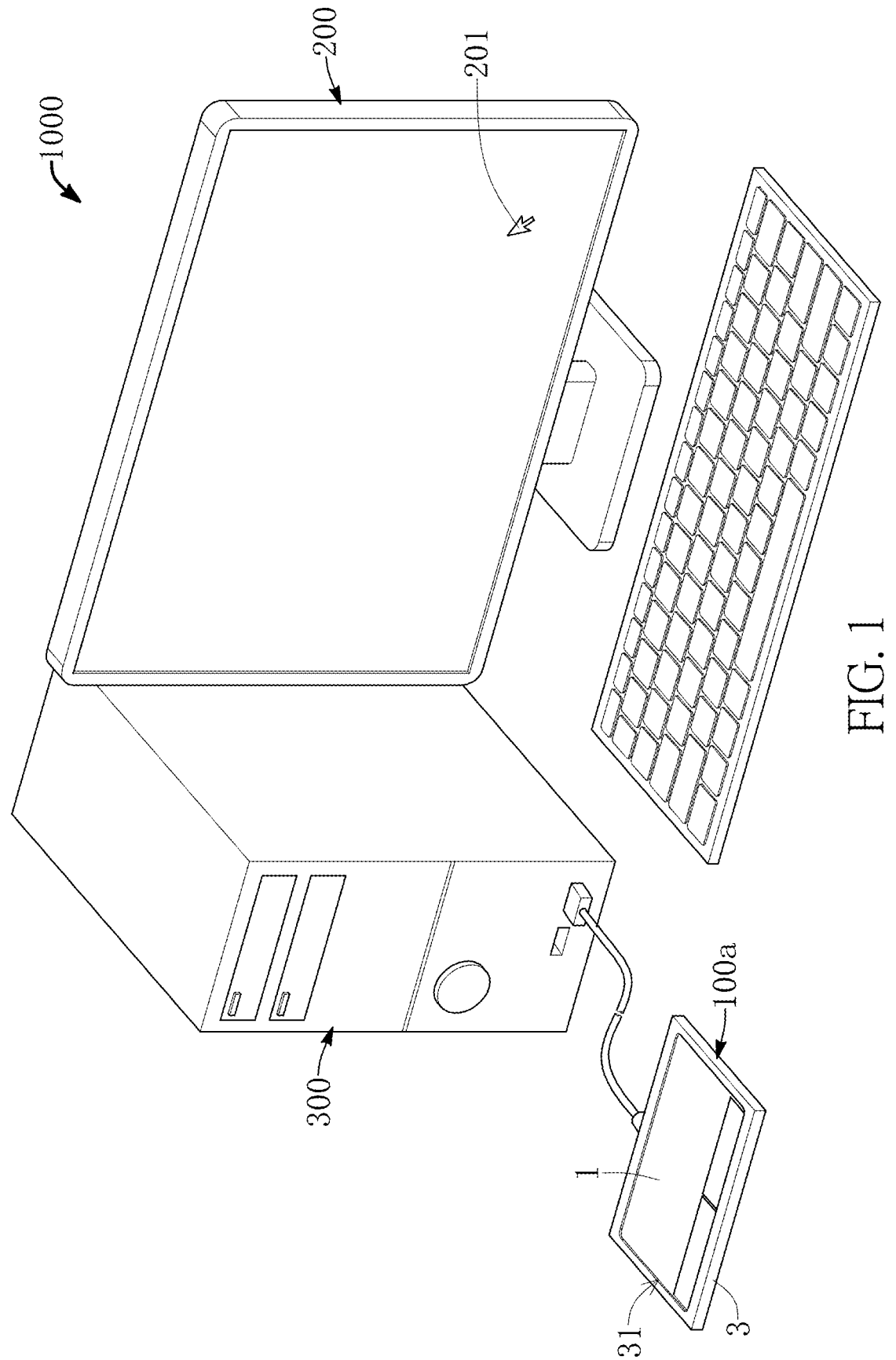
FIG. 1 is a schematic perspective view of a human interface device (HID) according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
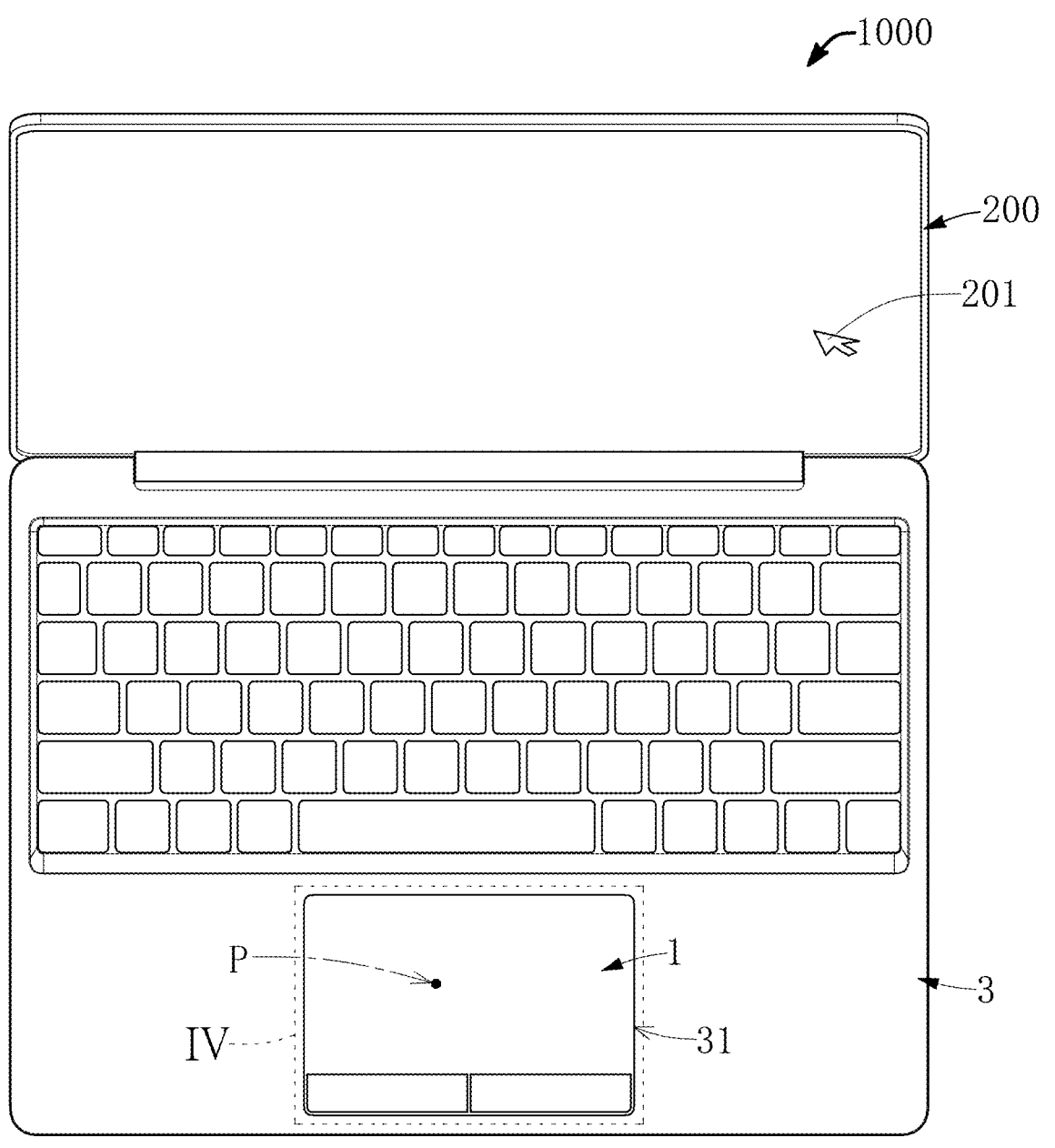
FIG. 2 is a schematic perspective view of the HID in another configuration according to the first embodiment of the present disclosure.
Figure 3:
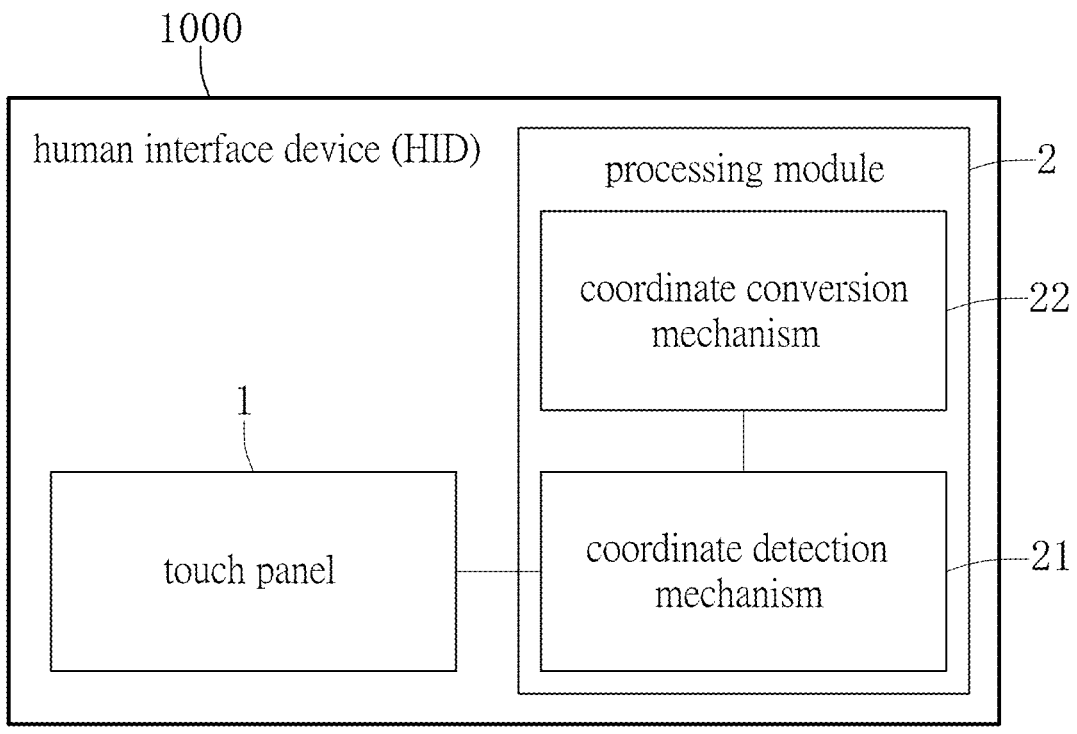
FIG. 3 is a schematic functional block view of the HID according to the first embodiment of the present disclosure.

Referring to FIG. 1 to FIG. 7, a first embodiment of the present disclosure is provided. As shown in FIG. 1 to FIG. 3, the present embodiment provides a human interface device (HID) 1000, which includes a touch panel 1 and a processing module 2 that is electrically coupled to the touch panel 1. The HID 1000 can be applied to different devices according to practical requirements.

As shown in FIG. 1 of the present embodiment, the HID 1000 can be a touchpad 100a, which includes a housing 3 having an opening 31. The touch panel 1 and the processing module 2 are assembled in the housing 3, and the touch panel 1 corresponds in position to the opening 31.

Moreover, the HID 1000 can include the touchpad 100a and a display 200 that is electrically coupled to the processing module 2 (e.g., the processing module 2 can be electrically coupled to the display 200 through an electronic device 300 in a wire manner or a wireless manner), but the present disclosure is not limited thereto. For example, as shown in FIG. 2, the HID 1000 can be a notebook computer, and the display 200 is pivotally connected to the housing 3.

Figure 4:
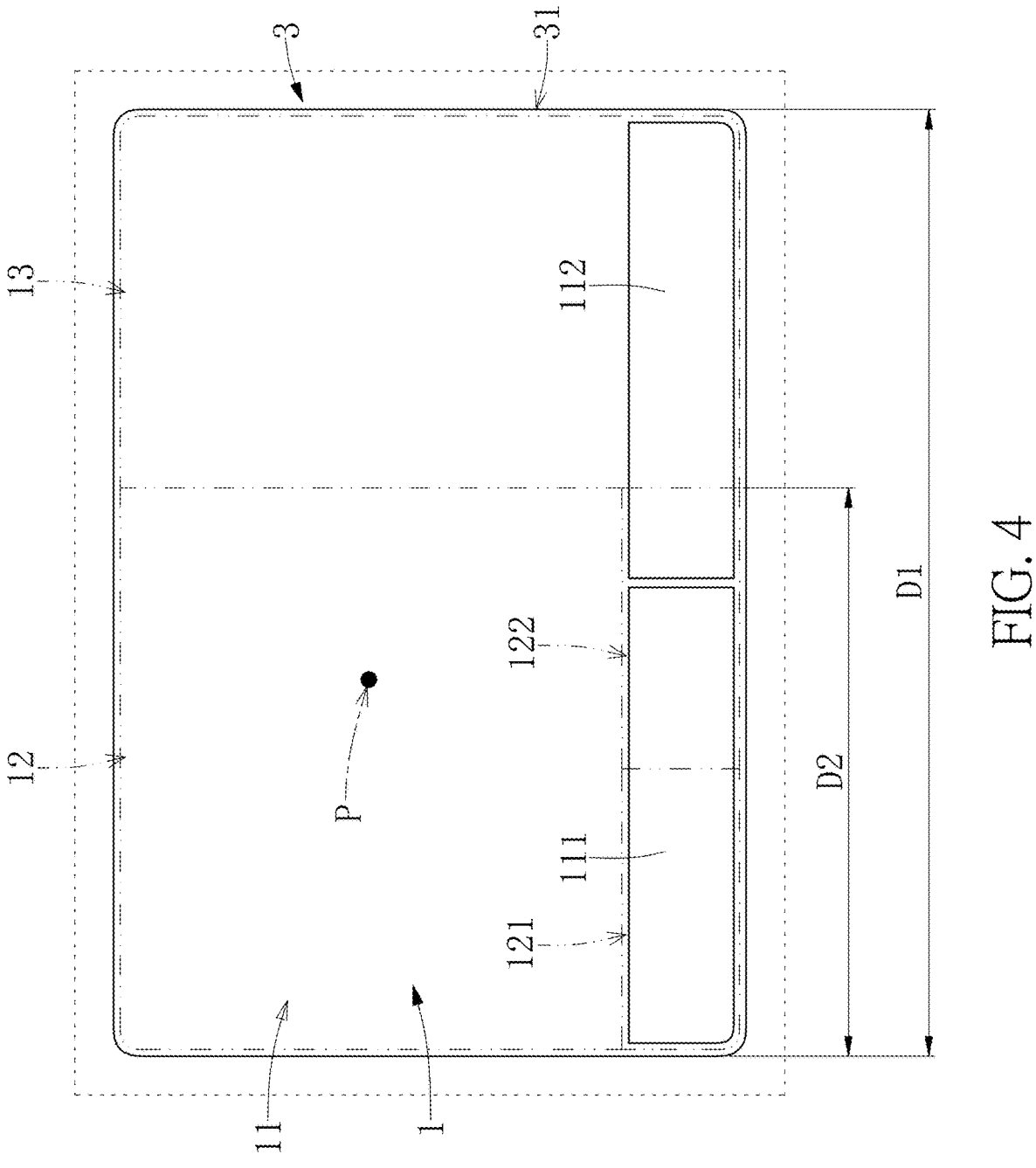
FIG. 4 is a schematic enlarged view of part IV of FIG. 2.

As shown in FIG. 3 and FIG. 4, the touch panel 1 has a first setting region 11 that is exposed from the opening 31 and that has a first length $D_1$. In the present embodiment, the first setting region 11 has a substantial rectangular shape, a long side of the first setting region 11 has the first length $D_1$, and an area of the first setting region 11 is substantially equal to an area of the opening 31. In other words, outer edges of the first setting region 11 are respectively flush with inner walls defining the opening 31.

Figure 5:
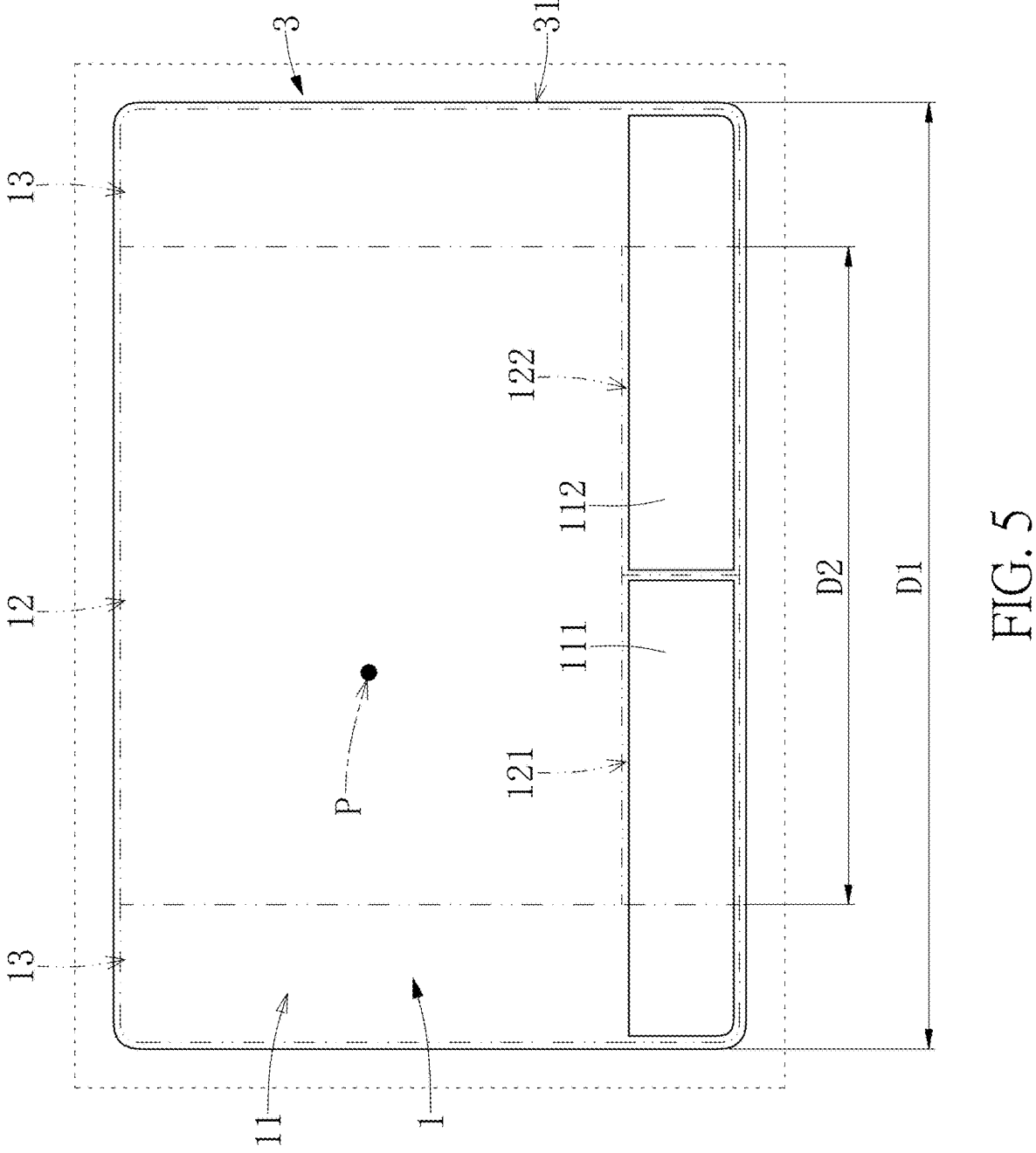
FIG. 5 is a schematic enlarged view showing the part IV of FIG. 2 in another configuration.

Moreover, the touch panel 1 defines a second setting region 12 in the first setting region 11 and at least one additional region 13 that is located in the first setting region 11 and that is arranged outside of the second setting region 12. In other words, the at least one additional region 13 is a portion of the first setting region 11 other than the second setting region 12, and a quantity of the at least one additional region 13 can be adjusted or changed according to design requirements. For example, as shown in FIG. 4, the quantity of the at least one additional region 13 can be one, and the additional region 13 is arranged at one side of the second setting region 12. Or, as shown in FIG. 5, the quantity of the at least one additional region 13 can be two, and the two additional regions 13 are respectively arranged at two opposite sides of the second setting region 12.

As shown in FIG. 4, an area of the second setting region 12 is within a range from 30% to 90% of the area of the first setting region 11, the second setting region 12 has a second length $D_2$ that is less than the first length $D_1$, and a width of the second setting region 12 is substantially equal to a width of the first setting region 11.

In the present embodiment, a top edge and a bottom edge of the second setting region 12 are respectively overlapped with a bottom edge of the first setting region 11, but the present disclosure is not limited thereto. For example, in other embodiments of the present disclosure not shown in the drawings, the top edge of the second setting region 12 can be spaced apart from the top edge of the first setting region 11.

As shown in FIG. 3, FIG. 4, FIG. 6, and FIG. 7, the first setting region 11 defines a first left button 111 and a first right button 112 that are arranged along the long side thereof, and a bottom side of the first left button 111 and a bottom side of the first right button 112 are overlapped with the bottom edge of the first setting region 11. Moreover, the second setting region 12 defines a second left button 121 and a second right button 122 that are arranged along the long side thereof, and a bottom side of the second left button 121 and a bottom side of the second right button 122 are overlapped with the bottom edge of the second setting region 12.

It should be noted that, in other embodiments of the present disclosure not shown in the drawings, the first left button 111 and the first right button 112 of the first setting region 11 (and/or the second left button 121 and the second right button 122 of the second setting region 12) can be omitted or can be replaced with other configurations according to practical requirements.

The processing module 2 includes a coordinate detection mechanism 21 and a coordinate conversion mechanism 22. The processing module 2 is configured to control the touch panel 1 to selectively operate the first setting region 11 in a first touch mode (through the coordinate detection mechanism 21) or the second setting region 12 in a second touch mode (through the coordinate detection mechanism 21 and the coordinate conversion mechanism 22).

In the present embodiment, the processing module 2 can be a processor, and the operation of the coordinate detection mechanism 21 and the coordinate conversion mechanism 22 can be implemented by corresponding programs or circuit designs for transmitting coordinates of the touch panel 1, but the present disclosure is not limited thereto.

Specifically, the coordinate detection mechanism 21 defines a first longitudinal coordinate axis X1 that has (or defines) a first minimum coordinate $X_{1\text{-}min}$, a first central coordinate $X_{1\text{-}central}$, and a first maximum coordinate $X_{1\text{-}max}$. In other words, two ends of the first longitudinal coordinate axis X1 are respectively defined as the first minimum coordinate $X_{1\text{-}min}$ and the first maximum coordinate $X_{1\text{-}max}$, and the first central coordinate $X_{1\text{-}central}$ is an average value of the first minimum coordinate $X_{1\text{-}min}$ and the first maximum coordinate $X_{1\text{-}max}$.

Moreover, the first minimum coordinate $X_{1\text{-}min}$ and the first maximum coordinate $X_{1\text{-}max}$ have a distance L1 therebetween mapping to the first length $D_1$ of the first setting region 11. For example, the first minimum coordinate $X_1$-min in the first longitudinal coordinate axis X1 is 0, the first maximum coordinate $X_{1\text{-}max}$ in the first longitudinal coordinate axis X1 is $D_1$, and the first central coordinate $X_{1\text{-}central}$ in the first longitudinal coordinate axis X1 is $D_1/2$. In addition, the first left button 111 and the first right button 112 of the first setting region 11 are defined for being respectively mapped to two opposite sides of the first central coordinate $X_{1\text{-}central}$.

The coordinate conversion mechanism 22 defines a second longitudinal coordinate axis X2 that has (or defines) a second minimum coordinate $X_{2\text{-}min}$, a second central coordinate $X_{2\text{-}central}$, and a second maximum coordinate $X_{2\text{-}max}$. In other words, two ends of the second longitudinal coordinate axis X2 are respectively defined as the second minimum coordinate $X_{2\text{-}min}$ and the second maximum coordinate $X_{2\text{-}max}$, and the second central coordinate $X_{2\text{-}central}$ is an average value of the second minimum coordinate $X_{2\text{-}min}$ and the second maximum coordinate $X_{2\text{-}max}$.

Moreover, the second minimum coordinate $X_{2\text{-}min}$ and the second maximum coordinate $X_{2\text{-}max}$ have a distance L2 therebetween mapping to the second length $D_2$ of the second setting region 12. The second central coordinate $X_{2\text{-}central}$ is defined to be same as the first central coordinate $X_{1\text{-}central}$ (e.g., the second central coordinate $X_{2\text{-}central}$ in the second longitudinal coordinate axis $X_2$ is $D_1/2$), the second minimum coordinate $X_{2\text{-}min}$ can be obtained by the following first equation: $X_{2\text{-}min}=(X_{1\text{-}max}-D_2)/2$, and the second maximum coordinate $X_{2\text{-}max}$ can be obtained by the following second equation: $X_{2\text{-}max}=(X_{1\text{-}max}+D_2)/2$. In addition, the second left button 121 and the second right button 122 of the second setting region 12 are defined for being respectively mapped to two opposite sides of the second central coordinate $X_{2\text{-}central}$.

For example, when the first length $D_1$ is 100 mm and the second length $D_2$ is 60 mm, the first minimum coordinate $X_{1\text{-}min}$ is defined as 0, the first maximum coordinate $X_{1\text{-}max}$ is defined as 100, and the first central coordinate $X_{1\text{-}central}$ and the second central coordinate $X_{2\text{-}central}$ are each defined as 50, such that the second minimum coordinate $X_{2\text{-}min}$ is defined as 20 through the first equation, and the second maximum coordinate $X_{2\text{-}max}$ is defined as 80 through the second equation. Accordingly, since the HID 1000 is provided with the coordinate conversion mechanism 22, the touch panel 1 has a first dots per inch (DPI) in the first control mode and a second DPI in the second touch mode, and the first DPI is equal to the second DPI.

In summary, the HID 1000 of the present embodiment can be configured to transmit coordinates of the first setting region 11 and the second setting region 12 of the touch panel 1, and can provide a determination of left button and right button of the touch panel 1 through the coordinate detection mechanism 11 and the coordinate conversion mechanism 12, thereby remedying the issues of a conventional operating system (OS) only performing analysis on the first setting region 11, and effectively expanding the functionality of the touch panel 1.

When the touch panel 1 is operated in any one of the first touch mode and the second touch mode, the coordinate detection mechanism 21 is configured to detect a touch coordinate P' of the touch panel 1 corresponding to the first longitudinal coordinate axis X1. In addition, when the touch panel 1 is operated in the first touch mode, the first setting region 11 is operable to control a movement of a cursor 201 of the display 200 (as shown in FIG. 1 and FIG. 2). Moreover, when the touch panel 1 is operated in the second touch mode, the second setting region 12 is operable to control a movement of the cursor 201 of the display 200 (as shown in FIG. 1 and FIG. 2), and the at least one additional region 13 has an additional touch function that is different from a touch function of the second setting region 12 (e.g., the additional touch function designed for scrolling a screen image of the display 200) or has no touch function according to design requirements.

Specifically, when the touch panel 1 is operated in the second touch mode, a touch point P of the second setting region 12 (or the touch panel 1) is detected and defined as a first longitudinal coordinate $X_1$ of the touch coordinate P' in the first longitudinal coordinate axis X1 by the coordinate detection mechanism 21, and the coordinate conversion mechanism 22 convers the first longitudinal coordinate $X_1$ to be a second longitudinal coordinate $X_2$ of a touch coordinate P'' in the second longitudinal coordinate axis $X_2$.

Figure 6:
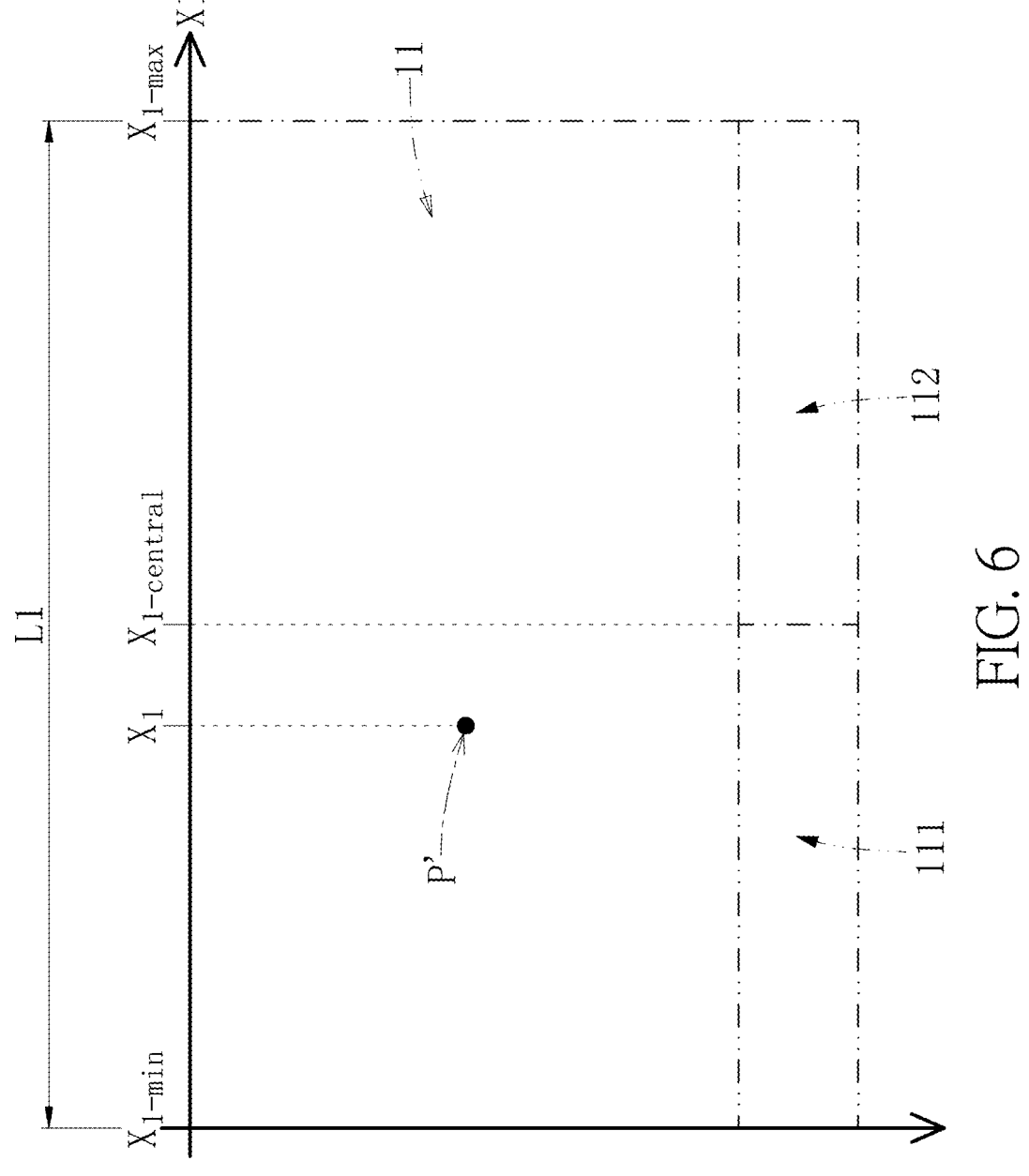
FIG. 6 is a schematic view showing a first longitudinal coordinate axis when a touch panel of the HID is in a first touch mode according to the first embodiment of the present disclosure.
Figure 7:
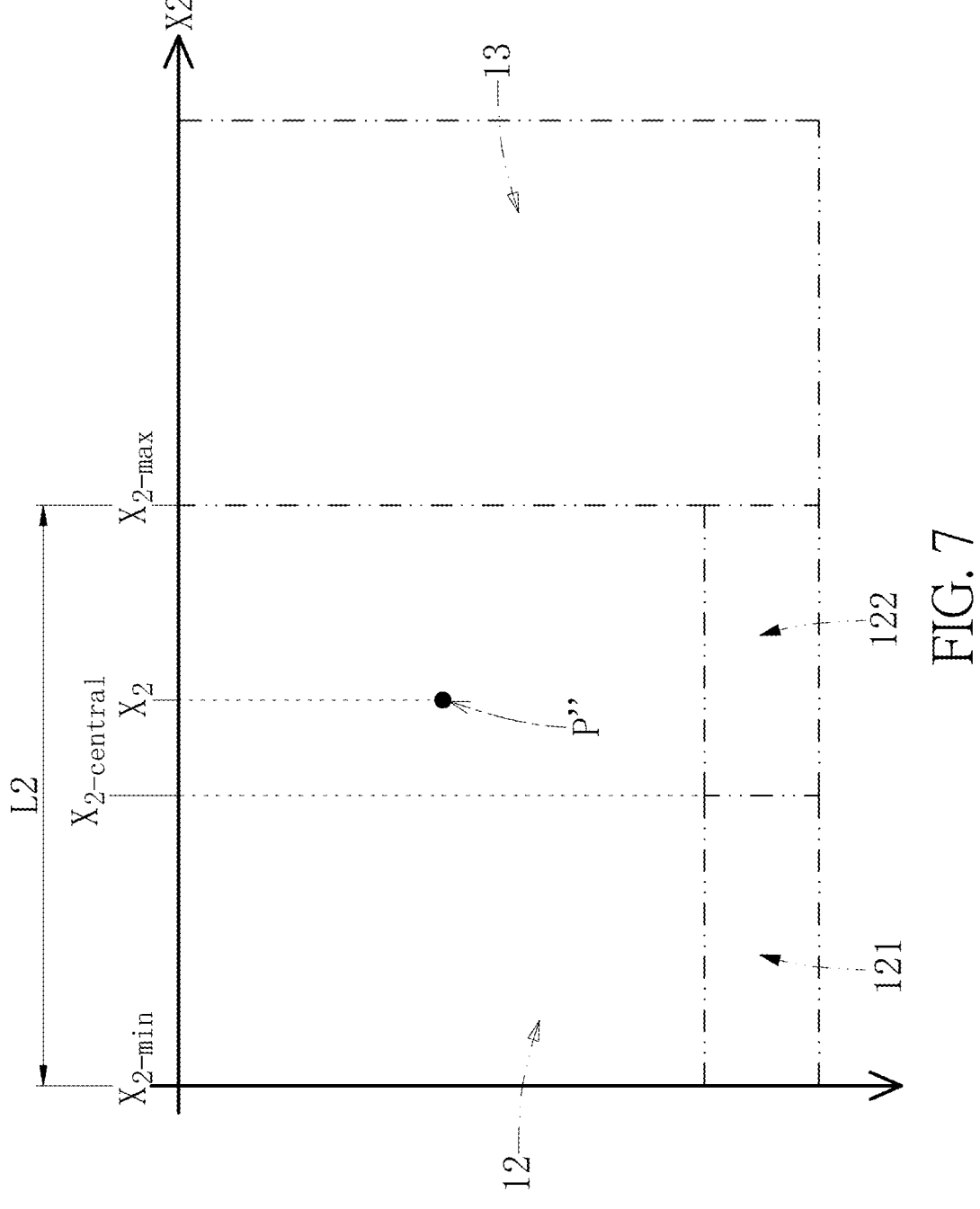
FIG. 7 is a schematic view showing a second longitudinal coordinate axis when the touch panel of the HID is in a second touch mode according to the first embodiment of the present disclosure.
Figure 8:
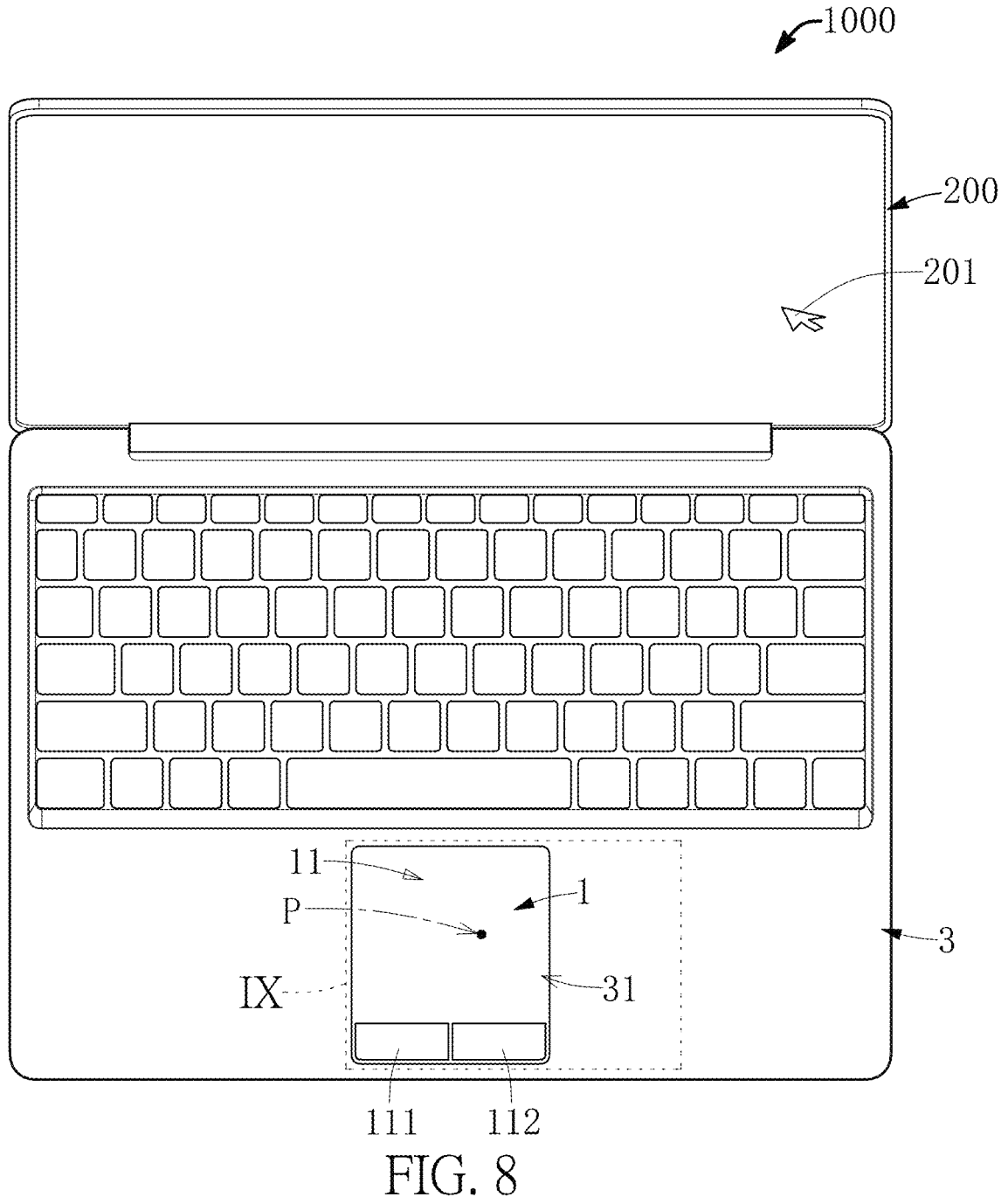
FIG. 8 is a schematic perspective view of the HID according to a second embodiment of the present disclosure.

As shown in FIG. 4, FIG. 6, and FIG. 7, a left edge of the second setting region 12 mapping to the second minimum coordinate $X_{2\text{-}min}$ is overlapped with a left edge of the first setting region 11 mapping to the first minimum coordinate $X_{1\text{-}min}$, and the second longitudinal coordinate $X_2$ is a sum of the first longitudinal coordinate $X_1$ and the second minimum coordinate $X_{2\text{-}min}$. For example, when the first longitudinal coordinate $X_1$ in the first longitudinal coordinate axis X1 is 40 and the second minimum coordinate $X_{2\text{-}min}$ in the second longitudinal coordinate axis X2 is 20, the second longitudinal coordinate $X_2$ in the second longitudinal coordinate axis X2 is 60.

In addition, since the width of the second setting region 12 in the present embodiment is substantially equal to the width of the first setting region 11, so that when the touch panel 1 is operated in any one of the first touch mode and the second touch mode, a width coordinate of any touch coordinate is obtained by the coordinate detection mechanism 21 and does not need to be converted by the coordinate conversion mechanism 22, but the present disclosure is not limited thereto. For example, in other embodiments of the present disclosure not shown in the drawings, the width of the second setting region 12 can be different from the width of the first setting region 11, and the coordinate conversion mechanism 22 can further define a conversion manner for the width coordinate according to the above description of the present embodiment.

Second Embodiment

Referring to FIG. 8 to FIG. 12, a second embodiment of the present disclosure, which is similar to the first embodiment of the present disclosure, is provided. For the sake of brevity, descriptions of the same components in the first and second embodiments of the present disclosure will be omitted herein (e.g., the processing module 2), and the following description only discloses different features between the first and second embodiments.

The size of the touch panel 1 of the present embodiment is smaller than that of the first embodiment. Specifically, the touch panel 1 has a first setting region 11 that is exposed from the opening 31 and that has a first length $D_1$. In the present embodiment, the first setting region 11 has a substantial rectangular shape, a long side of the first setting region 11 has the first length $D_1$, and an area of the first setting region 11 is substantially equal to an area of the opening 31. In other words, outer edges of the first setting region 11 are respectively flush with inner walls defining the opening 31.

Figure 9:
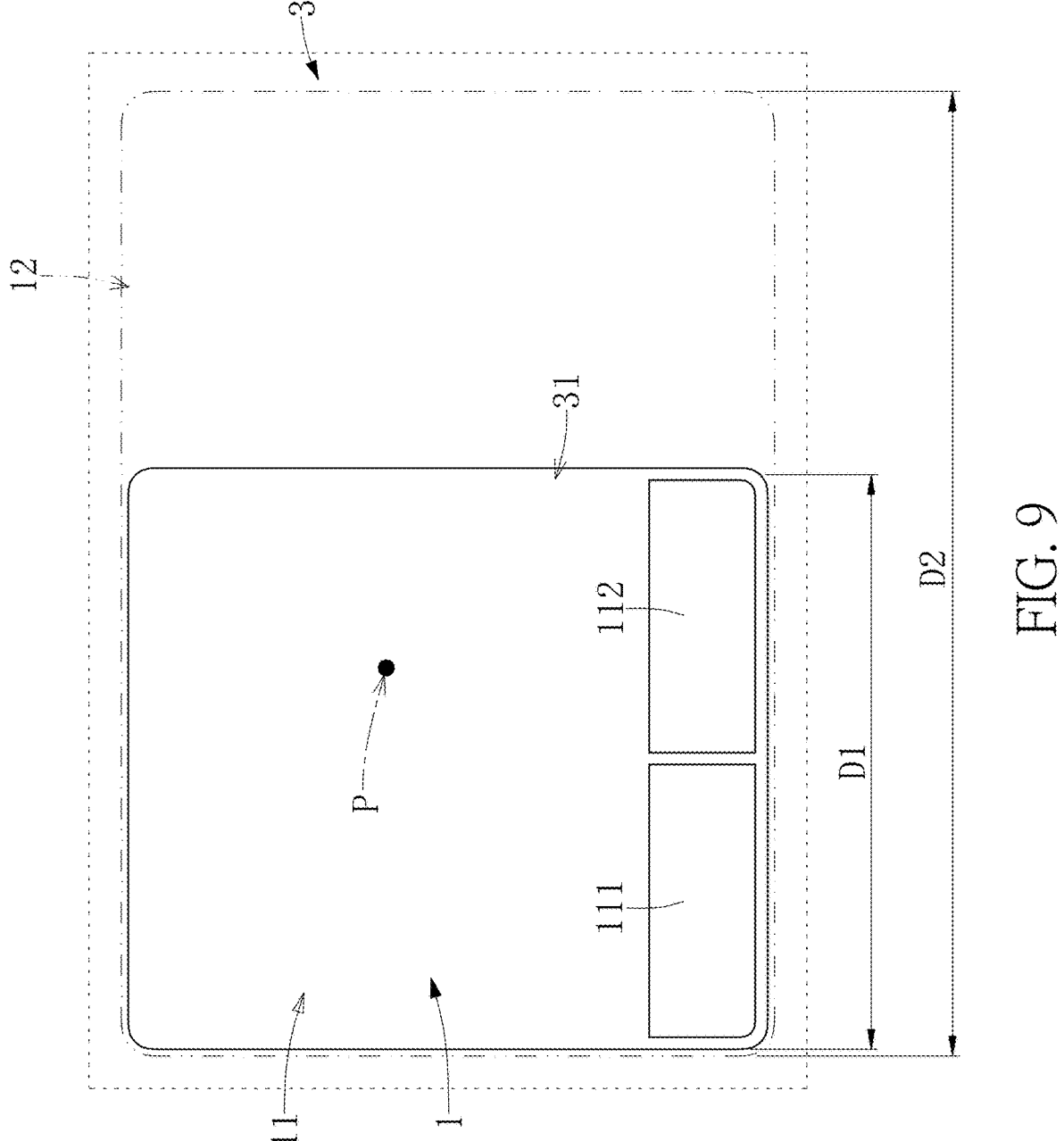
FIG. 9 is a schematic enlarged view of part IX of FIG. 8.
Figure 10:
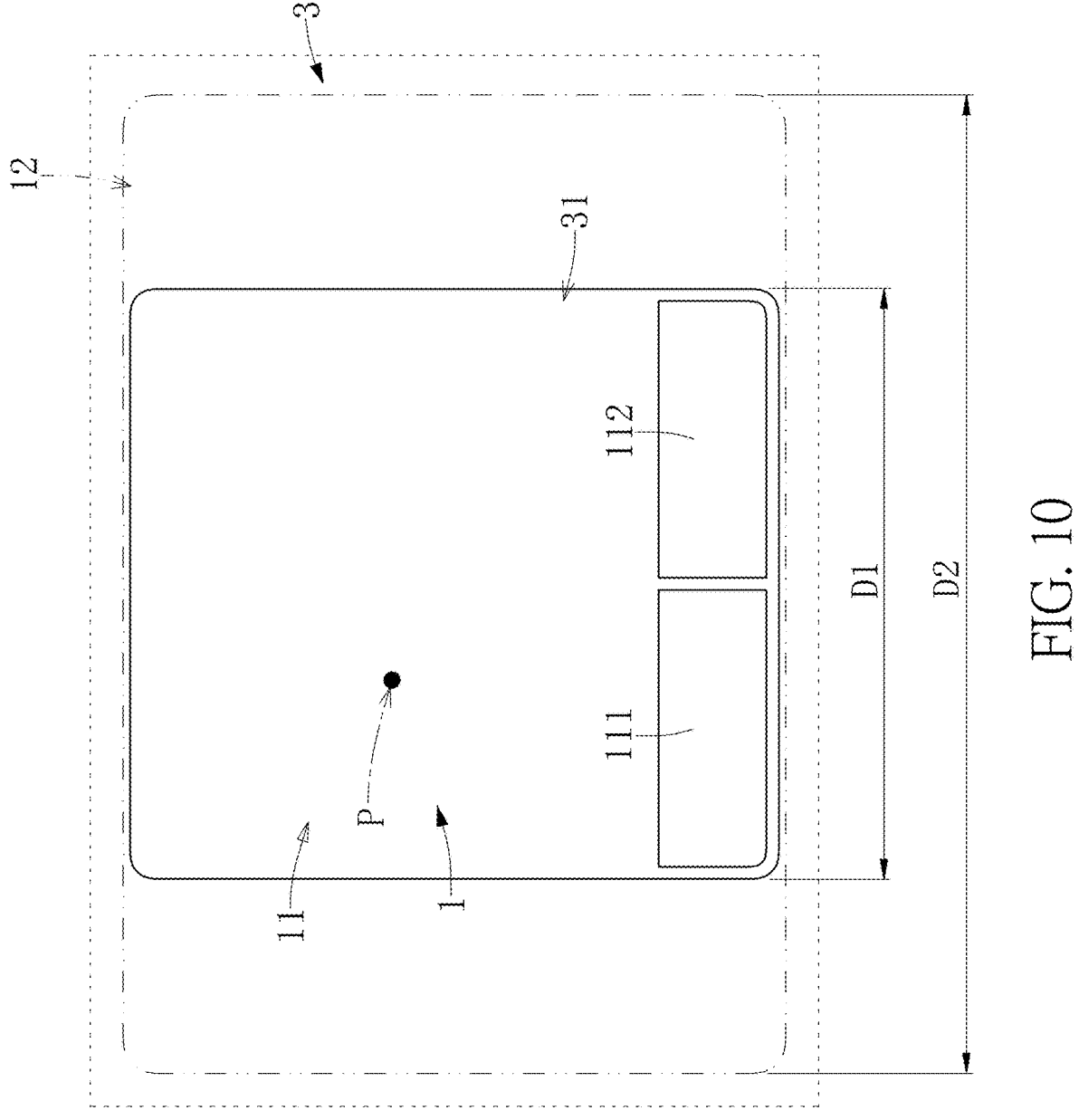
FIG. 10 is a schematic enlarged view showing the part IV of FIG. 8 in another configuration.
Figure 11:
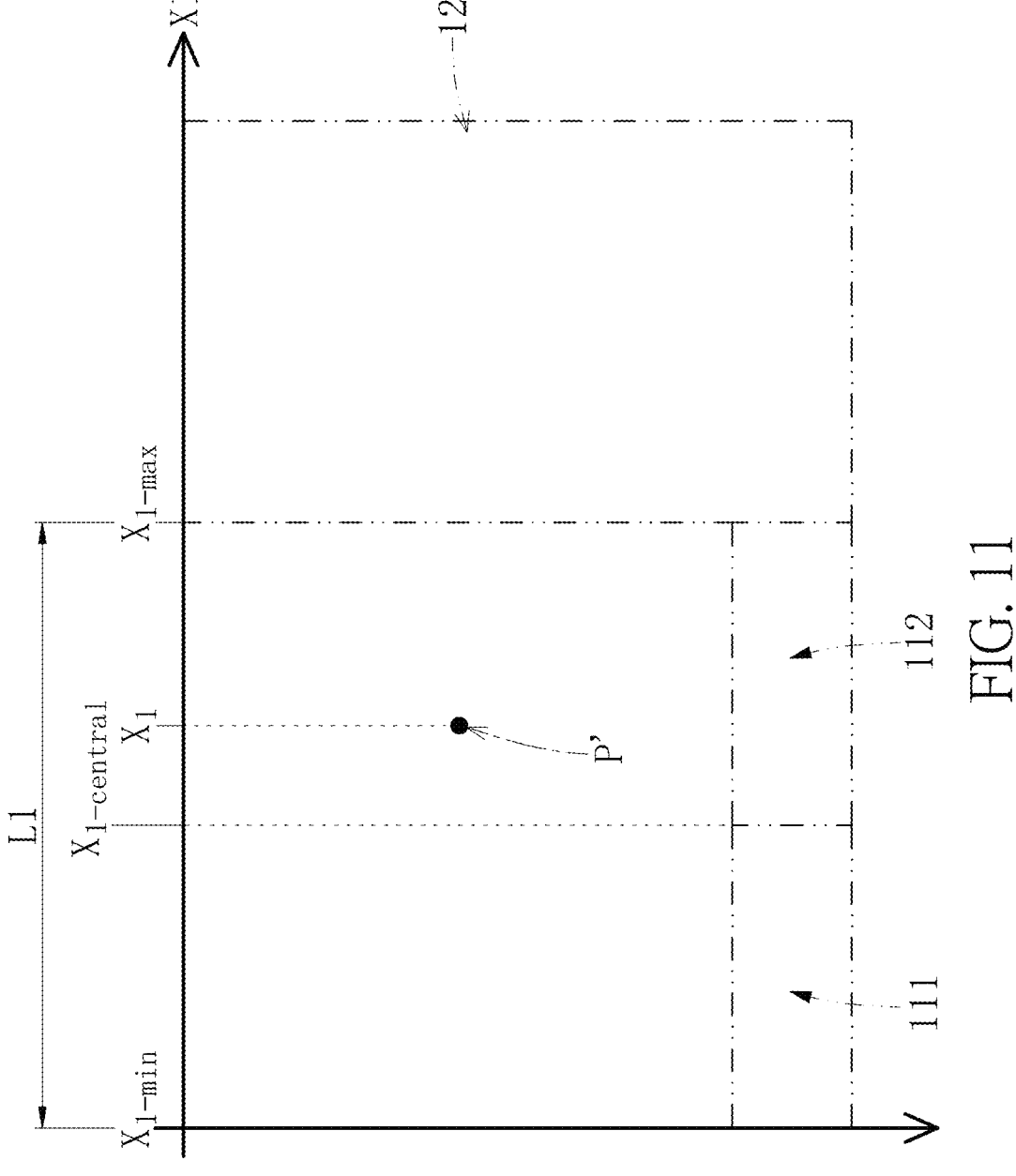
FIG. 11 is a schematic view showing the first longitudinal coordinate axis of the touch panel of the HID according to the second embodiment of the present disclosure.
Figure 12:
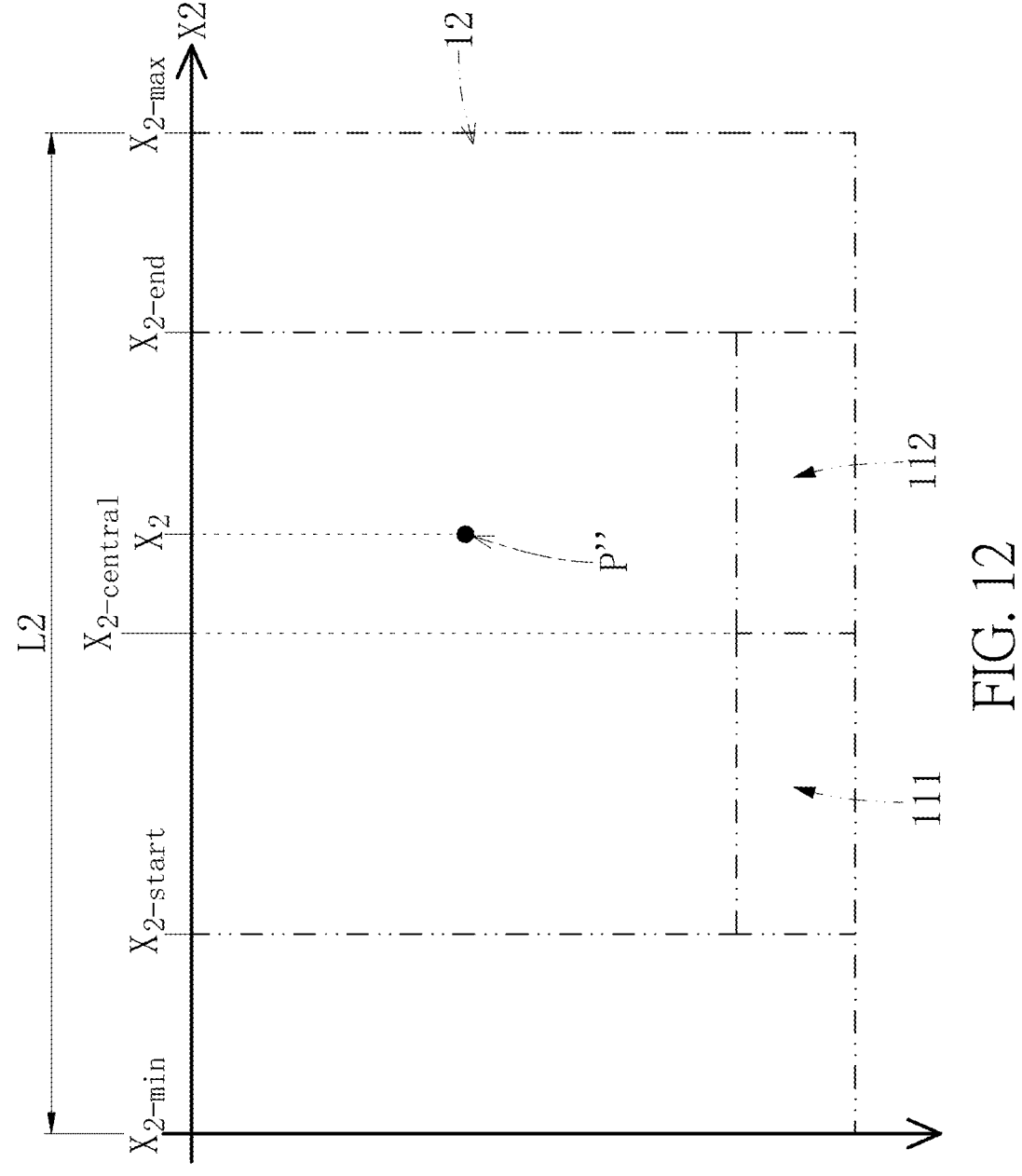
FIG. 12 is a schematic view showing the second longitudinal coordinate axis of the touch panel of the HID according to the second embodiment of the present disclosure.

Moreover, the touch panel 1 defines a second setting region 12 in the first setting region 11 covering the first setting region 11. In other words, the second setting region 12 is overlapped with the first setting region 11 and protrudes from the opening 31. For example, as shown in FIG. 9, the second setting region 12 can protrude from one side of the opening 31. Or, as shown in FIG. 10, the second setting region 12 can protrude from two opposite sides of the opening 31.

An area of the first setting region 12 is within a range from 30% to 90% of the area of the second setting region 11, the second setting region 12 has a second length $D_2$ that is greater than the first length $D_1$, and a width of the second setting region 12 is substantially equal to a width of the first setting region 11. In the present embodiment, a top edge and a bottom edge of the second setting region 12 are respectively overlapped with a bottom edge of the first setting region 11, but the present disclosure is not limited thereto.

The processing module 2 of the present embodiment is substantially identical to that of the first embodiment, and descriptions of the processing module 2 will be omitted herein for the sake of brevity. However, in the present embodiment, the first central coordinate is different from the second central coordinate, the second longitudinal coordinate axis $X_2$ further has a second start coordinate $X_{2\text{-}start}$ mapping to the first minimum coordinate $X_{1\text{-}min}$ and a second end coordinate $X_{2\text{-}end}$ mapping to the first maximum coordinate $X_{1\text{-}max}$, and the second start coordinate $X_{2\text{-}start}$ and the second end coordinate $X_{2\text{-}end}$ can be obtained by the following equations: $X_{2\text{-}start}=(X_{2\text{-}max}-D_1)/2$; and $X_{2\text{-}end}=(X_{2\text{-}max}+D_1)/2$. Furthermore, when the second setting region 12 of the touch panel 1 is operated, a touch point P of the touch panel 1 is detected and defined as a first longitudinal coordinate $X_1$ of the first longitudinal coordinate axis X1 by the coordinate detection mechanism, and the coordinate conversion mechanism converts the first longitudinal coordinate $X_1$ to a second longitudinal coordinate $X_2$ of the second longitudinal coordinate axis X2.

For example, when the first length $D_1$ is 60 mm and the second length $D_2$ is 100 mm, the first minimum coordinate $X_{1\text{-}min}$ and the second minimum coordinate $X_{2\text{-}min}$ are defined as 0, the first maximum coordinate $X_{1\text{-}max}$ is defined as 60, the second maximum coordinate $X_{2\text{-}max}$ is defined as 100, the first central coordinate $X_{1\text{-}central}$ is defined as 30, and the second central coordinate $X_{2\text{-}central}$ is defined as 50, such that the second start coordinate $X_{2\text{-}start}$ is defined as 20, and the second end coordinate $X_{2\text{-}end}$ is defined as 80. In other words, a range from 0 to 20 and a range from 80 to 100 in the second longitudinal coordinate axis X2 are not used. Moreover, when the first longitudinal coordinate $X_1$ in the first longitudinal coordinate axis X1 is 40 and the second start coordinate $X_{2\text{-}start}$ in the second longitudinal coordinate axis X2 is 20, the second longitudinal coordinate $X_2$ in the second longitudinal coordinate axis X2 is 60 through an equation of: $X_2=X_1+X_{2\text{-}start}$.

Specifically, in order to enable the HID 1000 to have a same DPI in the first setting region 11 and the second setting region 12, the processing module 2 converts the first longitudinal coordinate $X_1$ and the second longitudinal coordinate $X_2$ by a shifting manner, thereby ensuring a moving distance in the first longitudinal coordinate $X_1$ to be equal to a moving distance in the second longitudinal coordinate $X_2$.

In summary, according to the description of the first embodiment and the second embodiment of the present disclosure, the processing module 2 of the HID 1000 can be provided for the touch panel 1 having different sizes provided by the first and second embodiments through the coordinate detection mechanism and the coordinate conversion mechanism, thereby effectively meeting different practical requirements.

Beneficial Effects of the Embodiments

In conclusion, the HID of the present disclosure can be configured to transmit coordinates of the first setting region and the second setting region of the touch panel, and can provide a determination of left button and right button of the touch panel through the coordinate detection mechanism and the coordinate conversion mechanism, thereby remedying the issues that a conventional operating system (OS) only performing analysis of the first setting region, and effectively expanding the functionality of the touch panel.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A human interface device (HID), comprising:
   a touch panel having a first setting region that has a first length ($D_1$), wherein the touch panel defines a second setting region in the first setting region, and the second setting region has a second length ($D_2$) that is less than the first length; and
   a processing module electrically coupled to the touch panel and including:
   a coordinate detection mechanism defining a first longitudinal coordinate axis that has a first minimum coordinate ($X_{1\text{-}min}$), a first central coordinate ($X_{1\text{-}central}$), and a first maximum coordinate ($X_{1\text{-}max}$), and wherein the first minimum coordinate and the first maximum coordinate have a distance therebetween mapping to the first length of the first setting region, and the first central coordinate is an average value of the first minimum coordinate and the first maximum coordinate; and
   a coordinate conversion mechanism defining a second longitudinal coordinate axis that has a second minimum coordinate ($X_{2\text{-}min}$), a second central coordinate ($X_{2\text{-}central}$), and a second maximum coordinate ($X_{2\text{-}max}$), wherein the second minimum coordinate and the second maximum coordinate have a distance therebetween mapping to the second length of the second setting region, and the second central coordinate is defined to be same as the first central coordinate, and wherein the second minimum coordinate ($X_{2\text{-}min}$) and the second maximum coordinate ($X_{2\text{-}max}$) respectively satisfy two equations of:

$$X_{2-min} = (X_{1-max} - D_2)/2; \text{ and}$$

$$X_{2-max} = (X_{1-max} + D_2)/2;$$

wherein the processing module is configured to control the touch panel to selectively operate the first setting region in a first touch mode or the second setting region in a second touch mode;
wherein the coordinate detection mechanism is configured to detect a touch coordinate of the touch panel corresponding to the first longitudinal coordinate axis, and wherein, when the touch panel is in the second touch mode, a touch point of the touch panel is detected and defined as a first longitudinal coordinate ($X_1$) of the first longitudinal coordinate axis by the coordinate detection mechanism, and the coordinate conversion mechanism converts the first longitudinal coordinate to a second longitudinal coordinate ($X_2$) of the second longitudinal coordinate axis.

2. The HID according to claim 1, wherein a top edge and a bottom edge of the second setting region are respectively overlapped with a top edge and a bottom edge of the first setting region, and a width of the second setting region is identical to a width of the first setting region.

3. The HID according to claim 1, wherein the first setting region defines a first left button and a first right button respectively mapping to two opposite sides of the first central coordinate, and the second setting region defines a second left button and a second right button respectively mapping to two opposite sides of the second central coordinate.

4. The HID according to claim 3, wherein a bottom of the first left button and a bottom of the first right button are overlapped with a bottom edge of the first setting region, and a bottom of the second left button and a bottom of the second right button are overlapped with a bottom edge of the second setting region.

5. The HID according to claim 1, wherein an area of the second setting region is within a range from 30% to 90% of an area of the first setting region.

6. The HID according to claim 1, wherein a left edge of the second setting region is overlapped with a left edge of the first setting region, and the second longitudinal coordinate is a sum of the first longitudinal coordinate and the second minimum coordinate ($X_2 = X_1 + X_{2\text{-}min}$).

7. The HID according to claim 1, wherein the touch panel defines at least one additional region that is located in the first setting region and that is arranged outside of the second setting region, and wherein, when the touch panel is in the second touch mode, the at least one additional region has an additional touch function that is different from a touch function of the second setting region.

8. The HID according to claim 1, wherein the touch panel defines at least one additional region that is located in the first setting region and that is arranged outside of the second setting region, and wherein, when the touch panel is in the second touch mode, the at least one additional region has no touch function.

9. The HID according to claim 1, further comprising a housing that has an opening, wherein the touch panel and the processing module are assembled in the housing, the first setting region of the touch panel is exposed from the opening, and an area of the first setting region is substantially equal to an area of the opening.

10. The HID according to claim 9, further comprising a display that is electrically coupled to the processing module, wherein, when the touch panel is in the second touch mode, the second setting region is operable to control a movement of a cursor of the display.

11. The HID according to claim 1, wherein the touch panel has a first dots per inch (DPI) in the first control mode and a second DPI in the second touch mode, and the first DPI is equal to the second DPI.

* * * * *